United States Patent
Berndtsson

(10) Patent No.: US 6,427,827 B1
(45) Date of Patent: Aug. 6, 2002

(54) TRANSPORT APPARATUS FOR AN INFORMATION-BEARING ARTICLE, ESPECIALLY A CARD

(75) Inventor: Anders Berndtsson, Stein am Rhein (CH)

(73) Assignee: Altantic Zeiser GmbH, Emmingen-Liptingen (DE)

(*) Notice: Subject to any disclaimer, the term of this patent is extended or adjusted under 35 U.S.C. 154(b) by 53 days.

(21) Appl. No.: 09/589,652

(22) Filed: Jun. 8, 2000

(30) Foreign Application Priority Data

Jun. 12, 1999 (DE) .......................... 199 26 885

(51) Int. Cl.$^7$ .......................... B65G 15/14; B65G 15/60
(52) U.S. Cl. ................................ 198/626.6; 198/811
(58) Field of Search ................. 198/626.6, 811

(56) References Cited

U.S. PATENT DOCUMENTS

| | | | | |
|---|---|---|---|---|
| 3,908,816 A | * | 9/1975 | Brain .................. | 198/626.6 |
| 4,611,646 A | * | 9/1986 | Wasmer et al. ....... | 198/626.6 |
| 4,667,809 A | * | 5/1987 | Raybuck ............. | 198/626.6 |
| 4,735,302 A | * | 4/1988 | Marchetti ........... | 198/626.6 |
| 4,929,809 A | * | 5/1990 | Aso et al. ........... | 198/626.6 |
| 5,042,372 A | * | 8/1991 | Biedlfeldt et al. ... | 198/626.6 |
| 5,186,311 A | * | 2/1993 | Frye et al. ........... | 198/626.6 |
| 5,355,987 A | * | 10/1994 | DeWoolfson et al. ... | 198/626.6 |
| 5,626,219 A | * | 5/1997 | Deefholts et al. ..... | 198/626.6 |
| 5,755,073 A | * | 5/1998 | Moncreif et al. ..... | 198/626.6 |
| 6,189,758 B1 | * | 2/2001 | Cherix ............... | 198/626.6 |

FOREIGN PATENT DOCUMENTS

| | | |
|---|---|---|
| DE | 196 10 030 C2 | * 8/1998 |
| EP | 0 623 894 A1 | * 11/1994 |

\* cited by examiner

*Primary Examiner*—Joseph D. Pape
*Assistant Examiner*—Gregory A Blankenship
(74) *Attorney, Agent, or Firm*—Michael J. Striker

(57) ABSTRACT

The transport apparatus for magnetic cards includes a belt drive with an endless belt having a portion bearing on the information-bearing card conveyed by it and an opposing retaining member opposite the belt drive, on which the portion bearing on the information-bearing card can press the card during further transport. The portion of the endless belt on the opposite side from the information-bearing card is acted on with pressurized gas, especially pressurized air, to press the endless belt against the information-bearing card. The opposing retaining member can be another belt drive with another endless belt bearing on the information-bearing card, which is also acted on by compressed gas to provide additional clamping force to hold the information-bearing card fixed without vibration during transport.

47 Claims, 3 Drawing Sheets

TRANSPORT APPARATUS FOR AN INFORMATION-BEARING ARTICLE, ESPECIALLY A CARD

BACKGROUND OF THE INVENTION

The present invention relates to a transport apparatus for an information-carrying or information-bearing article, especially a card, and, more particularly, transport apparatus for an information-bearing article comprising a conveying device including a belt drive having two guide rollers arranged spaced from each other on a housing and an endless belt guided around the two guide rollers, so that a portion of the endless belt bears on a surface of the information-bearing article, when the information-bearing article travels through the second conveying device; and an opposing retaining member arranged opposite to the at least one belt driver on which the endless belt bears when the information-bearing article is clamped and conveyed between the portion of the endless belt and the opposing retaining member.

A transport apparatus of this type is known and described in DE 196 10 030 C2 and EP 0 623 894 A1, but this transport apparatus is unsuitable for transport of information-bearing articles with high throughput, e.g. with a throughput of about 40,000 to 48,000 of information carriers or information-bearing articles per hour, because at this high throughput no reliable coding of the information carriers is possible.

SUMMARY OF THE INVENTION

It is an object of the present invention to provide a transport apparatus of the above-described type that is formed so that reliable trouble-free coding of the information-bearing articles transported through it is guaranteed, even at very high transport throughput and great performance.

According to the invention, the transport apparatus for an information-bearing article, preferably a card, especially a card with a magnetic strip on which information is stored, having a surface strip, comprises a second conveying device including at least one belt drive comprising two guide rollers arranged spaced from each other on a housing and an endless belt guided around the two guide rollers, so that a portion of the endless belt bears on a surface of the information-bearing article in the vicinity of the surface strip when the information-bearing article passes through the second conveying device;

an opposing retaining member arranged opposite to the at least one belt drive on which the portion of its endless belt bears when the information-bearing article is clamped and conveyed between the portion of the endless belt and the opposing retaining member; and means for forcing compressed gas, preferably compressed air, continuously or at least periodically on at least a part of a side of the portion of the endless belt facing away from the information-bearing article in order to press the portion of the endless belt against the information-bearing article.

In a preferred embodiment of the invention the transport apparatus for an information-bearing article, preferably a card, especially a card with a magnetic strip on which information is stored, having a surface strip, comprises a first conveying device and a second conveying device;

wherein the first conveying device comprises a longitudinally extending conveyor belt having an upper surface and drive elements extending upward from the upper surface and spaced at predetermined distances from each other, the predetermined distances each being larger than a length of the information-bearing article; and wherein the second conveying device comprises at least one belt drive including two guide rollers arranged spaced from each other on a housing and an endless belt guided around the two guide rollers, so that a portion of the endless belt bears on a surface of the information-bearing article in the vicinity of the surface strip when the information-bearing article passes through the second conveying device; an opposing retaining member arranged opposite to the at least one belt driver on which the portion bears when the information-bearing article is clamped and conveyed between the portion and the opposing retaining member; and means for forcing compressed gas continuously or at least periodically on at least a part of a side of the portion of the endless belt facing away from the information-bearing article in order to press the portion on the information-bearing article during transport;

whereby the information-bearing article is conveyable on the conveyor belt to an entrance region of the at least one belt drive and is transferable to the at least one belt drive at its entrance region.

Further features and embodiments are described in the appended dependent claims and the specification and are incorporated here by reference thereto.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
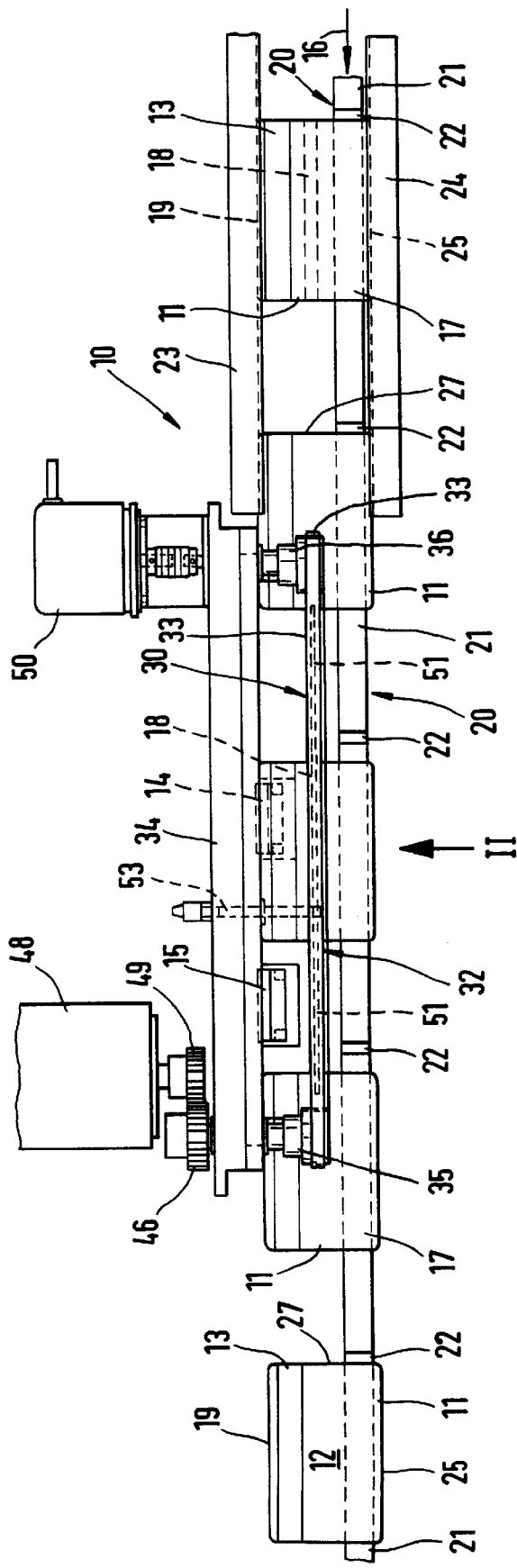
FIG. 1 is a top plan view of components of a transport apparatus according to the invention for an information-bearing article.

The interesting part of a transport apparatus 10, which is adapted for information-bearing articles 11, especially for cards, is shown in the drawing. The information-bearing articles 11 of this same type are provided, e.g., on their upper sides 12 as shown in FIG. 1, with a schematically indicated longitudinally extending magnetic strip 13 at least on one portion of the upper surface and are printed or otherwise provided with information on their lower sides and/or their upper sides 12 during passage through the transport apparatus 10. Furthermore the individual information-bearing articles 11 travel past at least one coding head, e.g. in this embodiment the two coding heads 14 and 15. The first coding head 14 operates as a writing head and is placed upstream of the second coding head 15, which functions as a reading head. The first coding head 14 writes the information on the magnetic strip 13. This information is stored on the magnetic strip 13 and is read by the second coding head 15 in order to check the writing process when the information-bearing article passes the second coding head 15. The information-bearing articles of this type, include magnetic cards, especially credit cards, telephone cards, customer cards or the like cards which can be provided with storable information. The transport apparatus 10 is part of an otherwise unshown machine, which is modular. Machines of this type structured according to the invention have a throughput of about 40,000 to 48,000 pieces per hour. These speeds and outputs permit the respective information bearing-articles 11 to be transported without vibration and always in exactly the same position when they are conducted past the first coding head 14 for coding the magnetic strip 13 and after that past the second coding head 15 for reading, because the slightest vibration or position displacement would lead to great errors.

The transport device 10 has a schematically indicated linear first conveying device 20, on which the information-bearing articles 11 are received and conveyed forward. The first conveying device 20 comprises a longitudinally traveling conveyor belt 21 driven in the direction of the arrow 16, which is provided with drive or catch elements 22. The drive elements 22 project above the upper side of the conveyor belt 21 and are arranged at predetermined distances from each other. It should be emphasized that the spacing of the drive elements 22 from each other along the longitudinal extent of the conveyor belt 21 is larger than the length of the respective information-bearing articles 11. The width of the conveyor belt 21 is smaller than the width of the respective information-bearing articles 11. Each information-bearing article 11 has a small surface region 17 spaced transversely from the magnetic strip 13 and located at a predetermined lateral distance from it. The information-bearing articles 11 rest with their surface regions 17 on the conveyor belt 21 and are transported forward with it so that the region of the magnetic strip 13 and an adjacent surface strip 18 of the information-bearing article 11 spaced transversely from the magnetic strip 13 are free, i.e. do not bear on the conveyor belt 21 like the surface region 17. The conveyor belt 21 is a natural or synthetic rubber or plastic belt. The drive elements 22 each comprise an upwardly protruding transversely extending element, which can extend beyond the width of the conveyor belt 21. A first longitudinal guide member 23 for a facing longitudinal edge 19 of the information-bearing article 11 is arranged along a longitudinal side of the conveyor belt 21 extending approximately parallel to it and laterally beside it. Also a corresponding second longitudinal guide member 24 for the other facing longitudinal edge 25 of the information-bearing article 11 is arranged on the opposite side of the conveyor belt 21 Both longitudinal guide members 23,24 extend approximately parallel to the conveyor belt 21 and extend up to an entrance region 26 of a second conveying device 30, which is a modular component of the transport apparatus 10 and the machine. Each longitudinal guide member 23,24 has an L-profile, or instead of that a U-profile laterally open and laterally directed in, on the side which is facing the associated longitudinal edge 19 or 25 of the respective information-bearing articles 11. The individual information-bearing articles 11 resting on the conveyor belt 21 are aligned and stabilized by the action of the transversely extending drive elements 22, which can contact the rear transverse edges 27 of the respective information-carrying articles 11. Reliable longitudinal guidance of the individual information-bearing articles 11 without transverse displacement is guaranteed during forward transport on the conveyor belt 21 by the longitudinal guide members 23 and 24 on both sides, which cooperate with the associated longitudinal edges 19 and 25 of each information-bearing article 11.

As is especially apparent from FIG. 1, the second conveying device 30 is located laterally beside the conveyor belt 21 and is arranged approximately parallel to it. The second conveying device 30 extends on that side of the conveyor belt 21, which faces the magnetic strip 13, the adjacent surface strip 18 and the longitudinal edge 19 of the information-bearing article 11, which means on the upper longitudinal side of the belt 21 in FIG. 1. Generally a small space is present between this longitudinal side of the belt 21 (first transport device) and the second conveying device 30. The respective information-bearing article 11 is conveyed on the conveyor belt 21 until at the entrance region 26 of the second conveying device 30. Then at this entrance region 26 it is completely released from the first conveying device comprising the conveyor belt 21 and transferred to this second conveying device 30. The respective information-bearing article 11 is then displaced forward from the drive element 22 in the conveying direction as shown by the arrow 16. This occurs because the second conveying device 30 is driven with greater speed than the first conveying device. The speed difference is selected, e.g., so that the respective forward conveyed information-bearing article 11, which is grasped in the entrance region 26 of the second conveying device 30, steps forward longitudinally in relation to the conveyor belt 21 from the drive element 22 on which it was resting. The speed difference between the speed of the conveyor belt 21 and that of the second conveying device 30 is selected so that the respective information-bearing article 11 then, when it is again released from the second conveying device 30 in the outlet region 31 opposite from the entrance region 26, is conveyed by the first conveying device comprising the conveyor belt 21 on a belt region between two drive elements 22 of the belt and then is conveyed further forward while resting on it. The conveying speed of the second conveying device 30 can be controlled so that it is about 2% greater than that of the conveyor belt 21, which is already sufficient so that the respective information-bearing articles 11 are completely released from the conveyor belt 21 when the second conveying device 30 takes the respective information-bearing articles 11 so that scarcely any vibration or other motions which might transferred from the conveyor belt 21 are transferred to the information-bearing articles 11.

During the forward motion of the individual information-bearing articles 11, resting on the belt 21, both the magnetic strip 13 and also the adjacent surface strip 18 on the upper side 12 of an individual article are free, so that both are accessible on reaching the entrance region 26 of the second conveying device 30. Of course the surface strip 18 remains free for gripping and holding the information-bearing article 11 by means of the second conveying device 30. In that way each individual information-bearing article 11 can be moved past the first and second coding heads 14 and 15 by the second conveying device 30 so that the region of the magnetic strip 13 can be written and read by the coding heads.

Special details of the second conveying device 30 are now explained. It has at least one belt drive 32 with an endless belt 33, which is guided over two rotatable guide rollers 35,36 mounted on a housing 34 and spaced from each other. A lower portion 37 of the endless belt 33 can contact on the upper side 12 of each information-bearing article 11 on its upper surface in the vicinity of the middle surface strip 18. The second conveying device 30 has an opposing retaining member indicated generally with 38 opposite to the belt drive 32 on which the lower portion 37 can bear for holding and further conveying a drawn-in information-bearing article 11. This opposing retaining member 38 can comprise a plate or strap or at least one roller or the like in an unshown embodiment. In the embodiment shown the opposing retaining member is a second belt drive 39 similar to the first belt drive 32, which likewise has an endless belt 40, which is guided over two rotatable guide rollers 41,42 arranged spaced from each other on the housing 34. The lower portion 37 of the first belt drive 32 can bear on an upper portion 43 of the second belt drive 39 for holding and further conveying a drawn-in information-bearing article 11.

Each belt drive 32,39 has a clamping roller 44 or 45 of the usual kind for the endless belt 33 or 40.

The clamping spacing between the at least one belt drive 32 and the opposing retaining member, especially the second belt drive 39, is adjustable so that an adjustment for varying thickness of the information-bearing article 11, e.g. in a size range between 0.25 mm and 1.5 mm, is possible.

The first belt drive 32 is operatively connected with the second belt drive 39 by gear means and synchronized. In this embodiment the gear means comprises two meshing gear wheels 46 and 47. The first belt drive 32 is driven by means of an electrical drive motor 48, especially a servomotor, by means of a pinion 49, which is directly engaged, e.g., with one 46 of the gear wheels. The speed of the first belt drive 32, especially the endless belt 33, is controllable, e.g. according to the speed of the conveyor belt 21, preferably by means of angle encoder 50 measuring the respective belt speed.

The respective endless belt 33 or 40 is formed as a toothed belt and is made, e.g., of synthetic or natural rubber or plastic or the like material. The guide rollers 35,36 or 41,42 are toothed wheels or rollers and are adapted to the respective toothed belt. The teeth of the respective endless belt 33 or 40 fit the corresponding toothed wheels or rollers so that the endless belt 33 or 40 is engaged with them.

Figure 3:
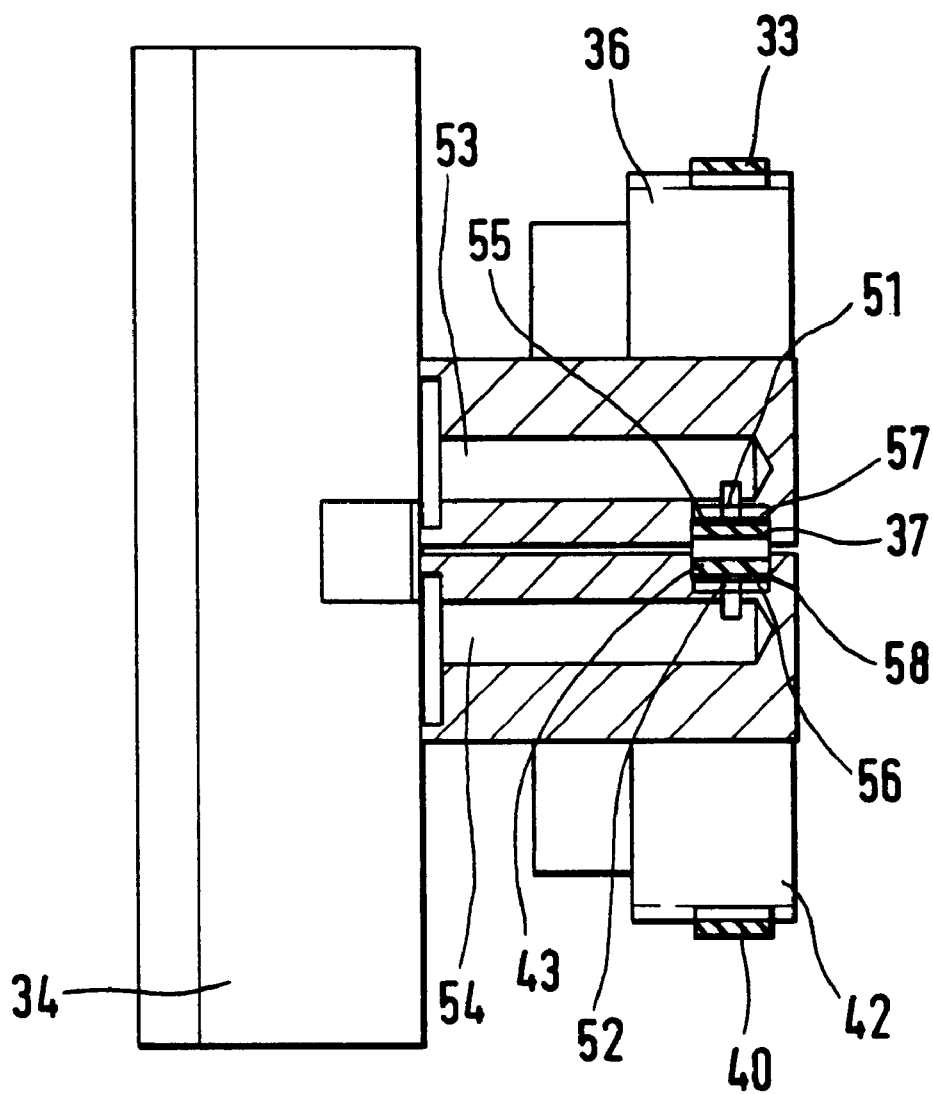
FIG. 3 is a schematic cross-sectional view of the transport apparatus of FIG. 1 taken along the section line III—III of FIG. 2.

As is apparent particularly from FIGS. 1 and 3, the endless belt 33 of the first belt drive 32 like the endless belt 40 of the second belt drive 39 clearly has a smaller width than that of the respective information-bearing article 11, so that a drawn-in information-bearing article 11 can be clamped between both portions 37 and 43 along the surface strip 18 located between the longitudinal edges 19 and 25 and outside of the region occupied by the magnetic strip 13 and thus transported or conveyed forward.

Figure 2:
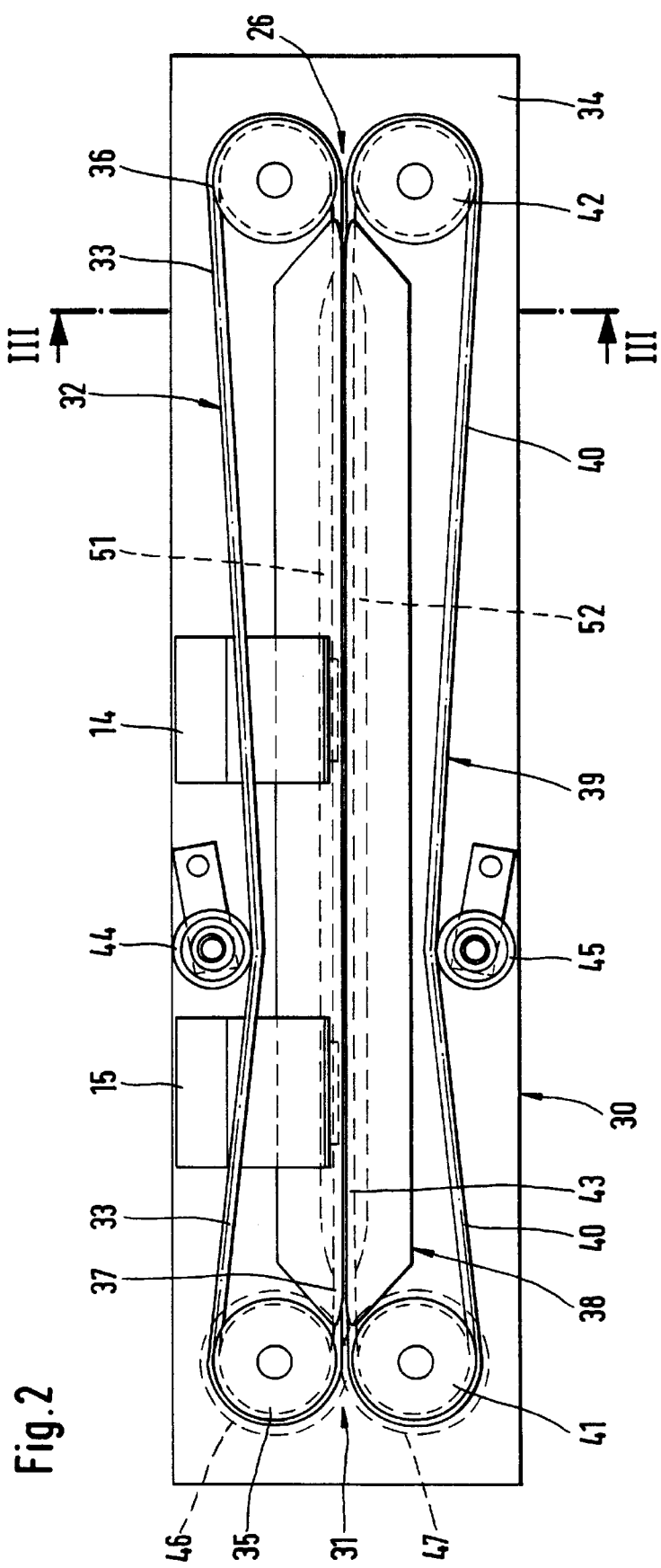
FIG. 2 is a detailed schematic side view in the direction of the arrow 11 in FIG. 1 of the transport apparatus of FIG. 1.

As is especially apparent in FIG. 2, the coding heads 14,15 are arranged along the transport path of the respective information-carrying articles 11 in the transport direction 30 and longitudinal regions of the portions 37,43, so that the coding heads 14,15 are placed in the longitudinally extending region between the guide rollers 35,36 or 41,42. Especially the coding head 14 operating as a writing head is spaced from the entrance region 26 and the coding head 15 operating as a reading head is spaced in front of the outlet region 31. The distance between both coding heads 14,15 is at least as great as the length of each information-bearing article 11, or card. It is especially suitable that this distance between the coding heads 14,15 is obviously or definitely greater than the length of each information-bearing article 11. This provides the advantage that when an information-bearing article 11 is still located in the vicinity of the coding head 15, no information-bearing article can reach the writing head 14. Because of this feature of this embodiment likely interference, especially impacts, which could otherwise act on the information-bearing article 11, can be prevented.

An additional essential feature of the transport apparatus 10, especially the modular conveying device 30, is that pressurized gas, especially pressurized air, acts continuously or at least periodically on at least portions of the side of the portion 37 of the at least one belt drive 32 facing away from the information-bearing article 11 to provide an additional force pressing the portion 37, which bears on the upper side 12 of the information-bearing article 11, on the upper side 12 of the information-bearing article 11. In the embodiment shown in the drawing both the portion 37 of the first drive belt 32 and also the portion 43 of the second drive belt 39 are acted on with pressurized gas, in this case pressurized air. The acting direction is arranged so that both portions 37 and 43 are pressed toward each other by the pressurized gas, especially pressurized air, so that the respective information-bearing articles 11 are pressed between them with an increased clamping force. This increased clamping force is adjusted by means of the respective pressures of the pressurized gas, especially pressurized air. As a result, the respective information-bearing articles 11 are then clamped and held with increased force between the portions 37 and 43 by means of the force due to the pressurized gas on them so that they are released from the conveyor belt 21 and guided forward by means of the second conveying device 30 past the coding heads 14,15 reliably fixed in their orientation, gripped without slipping and vibration. Then they are released from the second conveying device 30 and transferred to the conveyor belt 21. The respective portions 37 and 43 are acted on with the pressurized gas, especially air, preferably in as equal a manner as possible, not only on comparatively short longitudinal portions, but also over their entire exposed length and/or width between the respective guide rollers 35,36 or 44,45. The pressures with which the pressurized gas acts on the respective portions 37,43, can be regulated so that the corresponding clamping forces of the portions 37,43 acting on the respective information-bearing articles 11 are sufficiently adjustable by varying these pressures.

As is only indicated in FIGS. 1 and 2 and shown in detail in FIG. 3, adjacent the respective portions 37,43 of the conveyor belts 33,40 the housing 34 is provided with one or more corresponding outlet openings 51 and 52 for the pressurized gas, which are, e.g., through-going slots and are connected with respective feed ducts 53 and 54. As shown in FIGS. 1 and 2 a plurality of outlet openings 51 and 52 are spaced from each other in the travel direction of the portions 37 and 43 acted on with the pressurized gas. These outlets 51,52 are formed by slots oriented so that their long sides extend in the travel direction of the portions 37,43 of the belts 33,40, so that each portion 37, 43 is acted on with the pressurized gas, especially pressurized air, over as much of its entire length as possible and as uniformly as possible.

In another unshown embodiment the outlet openings 51,52 are oriented transversely to the travel direction of the portions 37,43 so that their width can be e.g. about as great as the width of the respective portions 37,43. As shown in FIGS. 1 and 2, a series of outlet openings 51,52 are provided, which extend practically over the entire distance between both guide rollers 35,36 and 41,42.

A respective supporting surface 55, 56(FIG. 3), which is part of the housing 34 and which is provided with the outlet openings 51,52, is arranged adjacent to the side of the corresponding portion 37, 43 acted on by pressurized gas. As is apparent from FIG. 3, the respective outlet openings 51,52 open on the associated respective supporting surfaces 55,56. The individual outlet openings 51, as considered in the longitudinal direction of the portion 37, are connected with each other by a connecting duct, so that only one single feed duct 53 is required in the housing 34 in order to supply these outlet openings 51 with pressurized gas, especially pressurized air. In the same way the outlet openings 52 can also be supplied with pressurized gas. The supporting surface 55 with the outlet openings 51 is associated with the one portion 37, while the other supporting surface 56 with the other outlet openings 52 is associated with the other portion 43. The outlet openings 51,52 open on the side of the portions 37, 42 of the belts 33,40 facing away from the respective information-bearing article 11 being held and transported by them. The width of the supporting surfaces 55,56 can be selected somewhat wider than that of the endless belts 33,40. In the embodiment shown in the drawing the respective supporting surfaces 55,56 contain impressed grooves 57,58. The outlet openings 51,52 open onto the bottom surfaces of these grooves 57,58. The respective grooves 57,58 are formed as guides for the respective endless belts 33,40 and thus provide reliable transverse guidance for the respective portions 37,43.

As shown in FIG. 1, the endless belt 33 of the first belt drive 32 and the endless belt 40 of the second belt drive 39 run essentially in a common vertical plane, in which no longitudinal displacement of the endless belts 33,40 with respective to each other is provided. The second conveying device 30 thus formed is found in the longitudinal region of the upper longitudinal edge of the conveyor belt 21 and in the longitudinal region of the longitudinal edge of the respective supporting surface 55,56 shown below in FIG. 1 or to the right in FIG. 3.

The individual information-bearing articles 11 resting on the conveyor belt 21 and conveyed forwards in the direction of the arrow 16 by the conveyor belt 21 are reliably oriented in the longitudinal direction by the longitudinally extending guide members 23,24. They are conveyed until they reach the entrance region 26 of the special second conveying device 30. Then they are grasped, held and conveyed forward between the portions 37,43 of the belts 33,40. The grasping and holding takes place in the vicinity of the surface strip 18, so that the region of the magnetic strip is exposed. As soon as the individual information-bearing article 11 is taken into the entrance region 26 and is clamped, it is lifted at least slightly from the upper side of the conveyor belt 21 and is moved with its transverse edge 27 spaced forward in the conveying direction from the drive element 22 that was previously engaged with it. The information-bearing article 11 held and clamped reliably between the respective portions 37,43 of the belts 33,40 is released entirely from the conveyor belt 21, so that scarcely any vibrations, forces or the like present are likely to act on the information-bearing article 11. The information-bearing article 11 is conveyed in this manner in the direction of the outlet region 31 from the entrance region 26 by means of both belt drives 32,39 and passes first the coding head 14 acting as a writing head, by means of which appropriate information is stored on the magnetic strip 13. After that the information-bearing article 11 is conveyed by the coding head 15 acting as reading head, by means of which the stored information is read out and checked. The information-bearing article 11 reaches the outlet region and is delivered to the upper side of the conveyor belt 21 in the same orientation and indeed with its rear transverse edge 27 in front of a drive element 22, which again engages with the transverse edge 27 because of the slower travel of the conveyor belt 21 and conveys the information-bearing article 11 further on the conveyor belt 21.

The disclosure in German Patent Application 196 26 885.1 of Jun. 12, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a a transport apparatus for an information-carrying or information-bearing article, especially a card, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A transport apparatus (10) for an information-bearing article (11) having a surface strip (18), said transport apparatus comprising conveying means, wherein said conveying means comprises
    at least one belt drive (32) including two guide rollers (35,36) arranged spaced from each other on a housing (34) and an endless belt (33) guided around the two guide rollers, so that a portion (37) of said endless belt (33) bears on a surface (12) of the information-bearing article (11) in range of the surface strip (18) when the information-bearing article passes through said conveying means,
    an opposing retaining member (38) arranged opposite to the at least one belt drive (32) on which said portion (37) bears when said information-bearing article (11) is clamped and conveyed between said portion (37) and the opposing retaining member (38); and
    means for forcing compressed gas continuously or at least periodically on at least a part of a side of said portion (37) of said endless belt (33) facing away from said information-bearing article (11) in order to press said portion (37) on said information-bearing article (11).

2. The transport apparatus as defined in claim 1, wherein said pressurized gas is pressurized air.

3. The transport apparatus as defined in claim 1, wherein said information-bearing article is a card.

4. The transport apparatus as defined in claim 1, wherein the housing (34) is provided with at least one outlet opening (51) for said pressurized gas and at least one supply duct (53) connected with the at least one outlet opening for said pressurized gas, and wherein said at least one outlet opening (51) is provided in said housing (34) adjacent said side of said portion (37) of said endless belt (33) acted on by said compressed gas.

5. The transport apparatus as defined in claim 1, wherein the housing (34) is provided with a plurality of outlet openings (51) for said pressurized gas and a plurality of supply ducts (53) connected with said outlet openings to supply said pressurized gas to said outlet openings, and wherein said outlet openings (51) are provided in said housing (34) adjacent said side of said portion (37) of said endless belt (33) acted on by said compressed gas and said outlet openings (51) are spaced from each other in a travel direction of said portion (37) acted on by said pressurized gas.

6. The transport apparatus as defined in claim 5, wherein each of said outlet openings (51) is provided by a through-going slot in said housing.

7. The transport apparatus as defined in claim 6, wherein the portion (37) of the endless belt (33) acted on by said pressurized gas has a length between said guide rollers (35,36) and a width and said pressurized gas acts substantially uniformly over said length and said width of said portion (37).

8. The transport apparatus as defined in claim 5, wherein said outlet openings (51) are through-going slots with long sides and said long sides extend in said travel direction of said portion (37).

9. The transport apparatus as defined in claim 5, wherein said outlet openings (51) are through-going slots with long sides, said long sides are transverse to said travel direction of said portion (37) and said outlet openings (51) each have a slot width about as large as said width of said portion (37) of said endless belt (33).

10. The transport apparatus as defined in claim 5, wherein said housing (34) is provided with a supporting surface (55) for said portion (37) of said endless belt (33), said supporting surface (55) is associated with said side of said portion (37) facing away from said information-bearing article (11) and said outlet openings (51) are provided in said housing through said supporting surface (55).

11. The transport apparatus as defined in claim 4, wherein said at least one supply duct (53) is contained in said housing (34).

12. The transport apparatus as defined in claim 1, further comprising means for regulating a pressure of said compressed gas acting on said portion (37) of said endless belt (32) so that a clamping force acting on said information-bearing article (11) is sufficient to hold said information-bearing article (11) on said conveying means during travel of said information-bearing article.

13. The transport apparatus as defined in claim 1, further comprising at least one coding head (14,15) for information of the information-bearing card (11) arranged along a transport path of said information-bearing card (11) and along a longitudinally extended region of said portion (37) of said endless belt (33).

14. The transport apparatus as defined in claim 13, wherein said at least one coding head (14,15) comprises at least one of a reading head and a writing head.

15. The transport apparatus as defined in claim 14, wherein the information-bearing article (11) comprises a magnetic card with a magnetic strip (13), said writing head writes said information on said magnetic strip and said reading head reads said information from said magnetic strip.

16. The transport apparatus as defined in claim 13, wherein said at least one coding head (14,15) comprises a first coding head (14) acting as a writing head spaced from an entrance region (26) of said conveying means and a second coding head (15) acting as reading head spaced a distance from said first coding head at least as large as a length of said information-bearing article (11) in a direction along said transport path.

17. The transport apparatus as defined in claim 1, further comprising an electrical drive motor (48) for said at least one belt drive (32) and means for controlling a belt speed of said endless belt (32).

18. The transport apparatus as defined in claim 17, wherein said drive motor (48) is a servomotor and said means for controlling said belt speed controls a rotation speed of said drive motor.

19. The transport apparatus as defined in claim 1, wherein a clamping space is provided between said endless belt (32) and said opposing retaining member (38) and further comprising means for adjusting said clamping space.

20. The transport apparatus as defined in claim 1, wherein said opposing retaining member (38) arranged opposite to the at least one belt drive (32) comprises a second belt drive (39) and said second belt drive (39) includes two other guide rollers (41,42) arranged spaced from each other on said housing (34) and another endless belt (40) guided around the two other guide rollers, so that a portion (43) of said another endless belt (40) bears on said portion (37) of said endless belt (33) during clamping and holding of said information-bearing article (11).

21. The transport apparatus as defined in claim 20, further comprising means for forcing compressed gas continuously or at least periodically on at least a part of a side of said portion (43) of said another endless belt (40) facing away from said information-bearing article (11) in order to press said portion (43) on said information-bearing article (11).

22. The transport apparatus as defined in claim 21, further comprising means for connecting and synchronizing said at least one belt drive (32) and said second belt drive (39).

23. The transport apparatus as defined in claim 22, wherein said means for connecting and synchronizing includes two toothed wheels (46,47) engaged with each other.

24. The transport apparatus as defined in claim 21, wherein said guide rollers (35,36; 41,42) are toothed wheels, said endless belts (33,40) are made from synthetic or natural rubber or plastic material and are toothed belts that mesh with said guide rollers (35,36; 41,42).

25. The transport apparatus as defined in claim 21, wherein said housing is provided with respective supporting surfaces (55,56) associated with said portions (37,43) of said endless belts (33,40) and said means for forcing said compressed gas are arranged to press said information-bearing article (11) between the endless belts (33,40).

26. The transport apparatus as defined in claim 25, wherein said respective supporting surfaces (55,56) of said housing are wider than said endless belts (33,40).

27. The transport apparatus as defined in claim 25, wherein said respective supporting surfaces (55,56) are provided with corresponding impressed grooves (57,58) acting as belt guides for said endless belts and with outlet openings (51,52) for said pressurized gas in respective bottom regions of said corresponding impressed grooves (57,58) and said respective supporting surfaces (55,56) of said housing are wider than said endless belts (33,40).

28. The transport apparatus as defined in claim 27, wherein said information-bearing article (11) has a magnetic strip (13) for storing information and said endless belts (33,40) each have a width less than a width of said information-bearing article (11) and are arranged so as to clamp said information-bearing article (13) on said surface strip (18) adjacent said magnetic strip (13) and to thus convey said information-bearing article (13) when said information-bearing article is drawn into said conveying means.

29. The transport apparatus as defined in claim 28, wherein said endless belts (33,40) of the belt drives (32,39) travel in respective longitudinally extended regions along longitudinal edges of the respective supporting surfaces (55,56).

30. A transport apparatus as defined in claim 1, said conveying means comprising a conveying device (20);
wherein said conveying device (20) comprises a longitudinally extending conveyor belt (21) having an upper surface and a plurality of drive elements (22) extending upward from said upper surface and spaced at predetermined distances from each other, said predetermined distances each being larger than a length of said information-bearing article.

31. The transport apparatus as defined in claim 30, wherein said information-bearing article (11) is conveyable on said conveyor belt (21) to an entrance region (26) of said at least one belt drive (32) and is transferable to said at least one belt drive (32) at said entrance region (26).

32. The transport apparatus as defined in claim 30, wherein said information-bearing article is a card.

33. The transport apparatus as defined in claim 30, wherein said at least one belt drive (32) is arranged laterally beside said conveyor belt (21) extending approximately parallel thereto.

34. The transport apparatus as defined in claim 30, further comprising means for driving said at least one belt drive (32) with a speed greater than a speed of said conveyor belt (21).

35. The transport apparatus as defined in claim 34, wherein said means for driving said at least one belt drive (32) with said speed greater than said speed of said conveyor belt (21) adjusts a speed difference between said at least one belt drive (32) and said conveyor belt (21) so that said information-bearing article (11) that is engaged at said entrance region (26) of said at least one belt drive (32) and clamped and conveyed by said at least one belt drive (32) is shifted forward in a longitudinal direction on said conveyor belt (21) away from one of said drive elements (22).

36. The transport apparatus as defined in claim 35, wherein said speed difference selected so that said information-bearing article released at an outlet region (31) of said at least one belt drive (32) is transferred to a belt region of said conveyor belt (21) between two of said drive elements (22) of said conveyor belt (21).

37. The transport apparatus as defined in claim 34, wherein said speed of said at least one belt drive (32) is about 2% greater than said speed of said conveyor belt (21).

38. The transport apparatus as defined in claim 34, further comprising means for controlling said speed of said at least one belt drive according to said speed of said conveyor belt (21) and wherein said at least one belt drive (32) has a drive motor (48).

39. The transport apparatus as defined in claim 38, wherein said means for controlling said speed of said at least one belt drive includes means for measuring said speed of said conveyor belt (21) and said means for measuring said speed comprises an angle encoder (50).

40. The transport apparatus as defined in claim 39, wherein said conveyor belt (21) has a width that is smaller than a width of said information-bearing article (11), said information-bearing article is provided with a magnetic strip (13) for information storage, said surface strip (18) is next to the magnetic strip and a surface region (17) is spaced and separated from said magnetic strip by the surface strip (18), said conveyor belt (21) rests on said surface region (17) during transport of said information-bearing article (11) on the conveyor belt (21) so that said magnetic strip (13) and said surface strip (18) are accessible during transport, and, when said information-bearing article reaches said entrance region (26) of said at least one belt drive (32) during forward transport of said information-bearing article (11), said information-bearing article (11) is clamped by means of said at least one belt drive (32) on said surface strip (18) spaced transversely from said magnetic strip (13) and is released from said conveyor belt (21) and is conveyed forward.

41. The transport apparatus as defined in claim 30, wherein said conveyor belt (21) is made from synthetic or natural rubber or plastic material.

42. The transport apparatus as defined in claim 30, wherein said drive elements each comprises an upwardly protruding transversely extending element.

43. The transport apparatus as defined in claim 42, wherein said upwardly protruding transversely extending element extends over said width of said conveyor belt (21).

44. The transport apparatus as defined in claim 30, wherein said conveying device (20) includes a first longitudinally extending guide member (23) for an opposing longitudinal edge of said information-bearing article (11) and said first longitudinally extending guide member (23) is arranged beside and approximately parallel to said conveyor belt (21).

45. The transport apparatus as defined in claim 44, wherein said first longitudinally extending guide member (23) extends in a longitudinal direction approximately up to said entrance region (26) of said at least one belt drive (32).

46. The transport apparatus as defined in claim 44, wherein said conveying device (20) includes a second longitudinally extending guide member (24) on an opposite side of said conveyor strip (21) from said first longitudinally extending guide member (23) and said second longitudinally extending guide member (24) extends in a longitudinal direction approximately up to an entrance region (26) of said at least one belt drive (32).

47. The transport apparatus as defined in claim 46, wherein each of said guide members (23, 34) has an L-profile or an open U-profile and the guide members (23, 24) are arranged on opposite sides of said conveyor belt (21) facing respective longitudinal edges (19, 25) of the information-bearing article (11).

* * * * *